US008386955B1

(12) United States Patent
Weber et al.

(10) Patent No.: US 8,386,955 B1
(45) Date of Patent: Feb. 26, 2013

(54) USER-OPTIMIZED CONTENT FOR WEB BROWSING WINDOWS

(75) Inventors: Arnaud Claude Weber, Saratoga, CA (US); Alex Neely Ainslie, San Francisco, CA (US); Roma Rajni Shah, San Francisco, CA (US); John Nicholas Jitkoff, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/279,140

(22) Filed: Oct. 21, 2011

(51) Int. Cl.
G06F 3/048 (2006.01)
G06F 3/14 (2006.01)
G06F 3/00 (2006.01)

(52) U.S. Cl. ......... 715/781; 715/838; 715/864; 715/866

(58) Field of Classification Search .................. 715/769, 715/781, 838, 856, 864, 866
See application file for complete search history.

(56) References Cited

U.S. PATENT DOCUMENTS

| | | | | |
|---|---|---|---|---|
| 2005/0273463 | A1* | 12/2005 | Zohar et al. | 707/7 |
| 2006/0206834 | A1* | 9/2006 | Fisher et al. | 715/777 |
| 2006/0230356 | A1* | 10/2006 | Sauve et al. | 715/777 |
| 2007/0220441 | A1* | 9/2007 | Melton et al. | 715/781 |
| 2008/0022229 | A1* | 1/2008 | Bhumkar et al. | 715/838 |
| 2008/0307314 | A1* | 12/2008 | Cisler et al. | 715/738 |
| 2009/0106698 | A1* | 4/2009 | Hansen et al. | 715/838 |
| 2010/0070928 | A1* | 3/2010 | Goodger et al. | 715/838 |
| 2010/0180225 | A1* | 7/2010 | Chiba et al. | 715/777 |

OTHER PUBLICATIONS

Fowler, Dennis, Review: Opera 9.5—a fine browsing alternative, Jun. 18, 2008, Computerworld, retrieved via the Internet at http://www.computerworld.com/s/article/9099879/Review_Opera_9.5_a_fine_browsing_alternative on Feb. 14, 2012.*
Guide to using Opera Link, Jul. 8, 2011, Opera Software, retrieved via the Internet at http://web.archive.org/web/20110708030617/http://www.opera.com/browser/tutorials/link/ on Feb. 14, 2012.*
Velázquez, Esteban M., Introducing the Opera Link API, Oct. 14, 2010, Opera Software, retrieved via the Internet at http://dev.opera.com/articles/view/introducing-the-opera-link-api/ on Feb. 14, 2012.*
FoxTab—Getting Started, Nov. 22, 2010, retrieved via the Internet at http://web.archive.org/web/20101122200235/http://foxtab.com/gettingstarted/ on Feb. 15, 2012.*

(Continued)

Primary Examiner — Kieu Vu
Assistant Examiner — James T Durkin
(74) Attorney, Agent, or Firm — McDermott Will & Emery LLP (57) ABSTRACT

Computer-implemented methods for determining what to display to a user when the user opens a new web page browsing window in a web browser are provided. In one aspect, a method includes receiving a request to open a new web page browsing window, and providing the new web page browsing window for display, the new web page browsing window displaying, by default, either a collection of user selected web addresses or previously visited web pages. The method also includes receiving a request to display the collection that was not displayed by default in response to the request to open the new web page browsing window. The collection that was not displayed by default in response to the request to open the new web page browsing window becomes the default collection to display for a subsequent request. Systems, web browsers, and machine-readable media are also provided.

18 Claims, 6 Drawing Sheets

OTHER PUBLICATIONS

Willis, Nathan, Know-How Mozilla Weave, Jul. 2009, Issue 104, pp. 46-49.*

"New Tab Page—Microsoft Windows", Internet Explorer 9 Features, retrieved from <http://windows.microsoft.com/en-US/internet-explorer/products/ie-9/features/new-tab-page>, Jun. 22, 2011.

"New Tab Page—MozillaWiki", retrieved from <https://wiki.mozilla.org/New_Tab_page>, Jun. 15, 2011.

"New Tab Page: Basic Browser Settings—Google Chrome Help", retrieved from <http://www.google.com/support/chrome/bin/answer.py?answer=95451>, Jun. 22, 2011.

* cited by examiner

USER-OPTIMIZED CONTENT FOR WEB BROWSING WINDOWS

BACKGROUND

1. Field

The present disclosure generally relates to the transmission of data, over a network, and more particularly to the use of a computing device to communicate over a network.

2. Description of the Related Art

Web browsers have limited screen space with which to display multiple web pages. Accordingly, certain web browsers use a tabbed document interface (TDI) to open multiple tabbed windows (or "tabs") within a web browser. When a user wants to open a new web page in a new tab, the user can press a button to open a "new tab page." The new tab page may by default be empty or display previously viewed web pages. The user can select one of the previously viewed web pages to view in the new tab page or type a Uniform Resource Identifier (URI) address for a new web page to view in the new tab page.

SUMMARY

According to one aspect of the disclosure, a computer-implemented method for determining what to display to a user when the user opens a new web page browsing window in a web browser is disclosed. The method includes receiving a request to open a new web page browsing window in a web browser, and providing the new web page browsing window for display, the new web page browsing window displaying, by default, either a collection of user selected web addresses or a collection of previously visited web pages. The method also includes receiving a request to display the collection that was not displayed by default in response to the request to open the new web page browsing window. The collection that was not displayed by default in response to the request to open the new web page browsing window becomes the default collection to display for a subsequent request to open a new web page browsing window in the web browser.

According to another aspect of the disclosure, a system for determining what to display to a user when the user opens a new web page browsing window in a web browser is disclosed. The system includes a memory includes instructions for opening a new web page browsing window in a web browser, and a processor. The processor is configured to execute the instructions to receive a request to open a new web page browsing window in a web browser, and provide the new web page browsing window for display in response to the request to open the new web page browsing window, the new web page browsing window displaying, by default, either a collection of user selected web addresses or previously visited web pages. The processor is also configured to execute the instructions to receive a request to display the collection that was not displayed by default in response to the request to open the new web page browsing window. The collection that was not displayed by default response to the request to open the new web page browsing window becomes the default collection to display for a subsequent request to open a new web page browsing window in the web browser.

According to a further aspect of the disclosure, a mobile web browser for determining what to display to a user when the user opens a new web page browsing window in a web browser is disclosed. The mobile web browser includes a new web page interface configured to receive a request to open a new web page browsing window includes, by default, either a collection of user selected web addresses or a collection of previously visited web pages, and a selection interface configured to receive a request to display the collection that was not displayed by default in response to the request to open the new web page browsing window. The mobile web browser also includes a content display interface configured to display the collection of user selected web addresses or the collection of previously visited web pages. The collection that was not displayed by default in response to the request to open the new web page browsing window becomes the default collection to display for a subsequent new web page browsing window opened in the web browser.

According to one aspect of the disclosure, a machine-readable storage medium includes machine-readable instructions for causing a processor to execute a method for determining what to display to a user when the user opens a new web page browsing window in a web browser is disclosed. The method includes receiving a request to open a new web page browsing window in a mobile web browser, and providing the new web page browsing window for display, the new web page browsing window displaying, by default, either a collection of URI previously saved by the user, a collection of web pages identified as being viewed in other web browsers associated with the user, or a collection of web pages identified as being frequently viewed by the user. The method also includes receiving a request to display the collection that was not displayed by default in response to the request to open the new web page browsing window. The collection that was not displayed by default in response to the request to open the new web page browsing window becomes the default collection to display for a subsequent request to open a new web page browsing window in the mobile web browser.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

When a user requests a new tab page for viewing a web page to be opened in the disclosed web browser, a new tab page is displayed that displays, by default, either the user's previously viewed web pages or the user's bookmarks. The determination of what to display by default, either the user's previously viewed web pages or the user's bookmarks in the new tab page, is based on the user's previous selection of either the previously viewed web pages or the user's bookmarks when the user last opened a new tab page. By displaying the user's previous selection, the disclosed web browser saves the user the time and effort of selecting what to display each time the user opens a new tab page. The disclosed web browser also takes advantage of the limited screen space of the web browser (e.g., if viewed on a mobile device) by displaying what the user prefers to see.

For example, in certain embodiments of the disclosed web browser, a new tab page by default displays either a list of (1) recently visited web pages (e.g., most visited web pages, frequently visited web pages, etc.), (2) the user's bookmarks, or (3) the user's currently opened tabs (e.g., in associated web browsers). These items can be displayed in a list or thumbnail format. If list (1) is displayed by default, and the user selects to view list (2), then when the next new tab page is opened by the user, the web browser displays the list (2) because it was previously selected from by the user, thereby remembering the user's preference and saving the user time. The next new tab page can also be pre-loaded and pre-rendered by the web browser in order to save time when the user requests the next new tab page to be displayed.

Although many examples provided herein describe a user's information (e.g., web browsing history) being stored in memory, the user can, at any time, delete the user information from memory and/or opt out of having the user information stored in memory. Additionally, the user can, at any time, adjust appropriate privacy settings to selectively limit the types of user information stored in memory. The user information does not include and/or share the specific identification of the user (e.g., the user's name) unless otherwise specifically provided or directed by the user.

Figure 1:
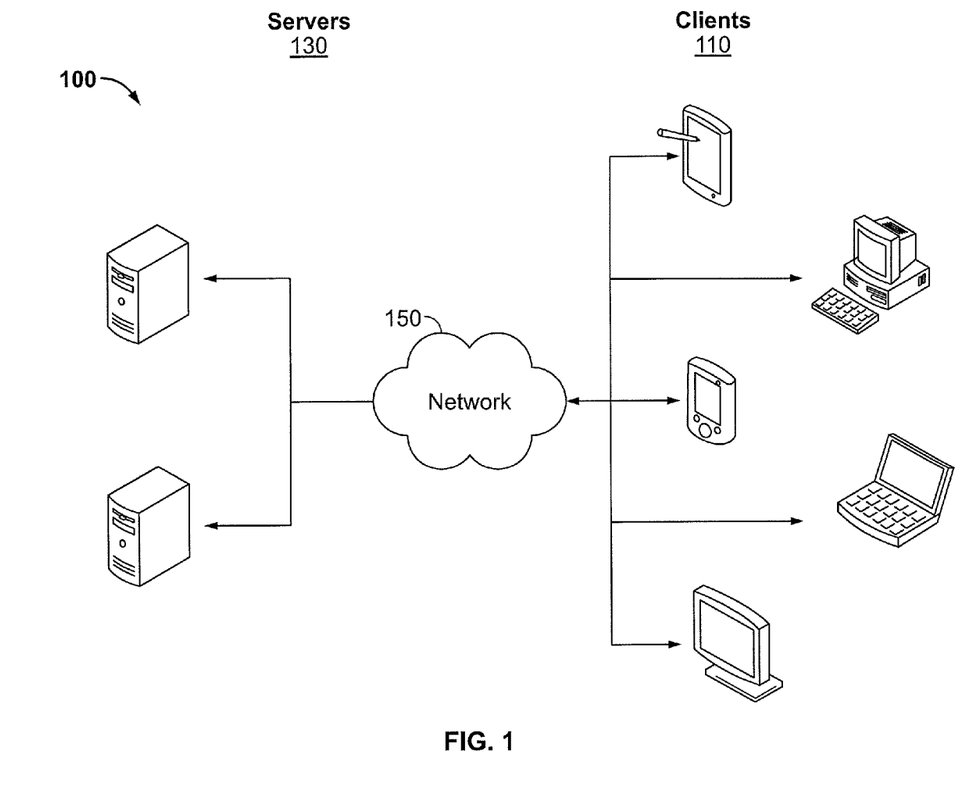
FIG. 1 illustrates an exemplary architecture for determining what to display to a user when the user opens a new web page browsing window in a web browser.

FIG. 1 illustrates an exemplary architecture 100 for determining what to display to a user when the user opens a new web page browsing window in a web browser. The architecture 100 includes servers 130 and clients 110 connected over a network 150.

Each of the clients 130 is configured to download, install, and run a web browser as disclosed herein. The web browser is configured to run on clients 130 that are mobile or non-mobile. The clients 110 can be, for example, desktop computers, laptop computers, mobile devices (e.g., a smartphone, tablet computer, or PDA), set top boxes (e.g., for a television), video game consoles, or any other devices having appropriate processor, memory, and communications capabilities. In certain aspects, certain advantages of the web browser, such taking advantage of limited screen display area, are most salient on clients 110 that are mobile devices or that otherwise have limited screen space.

The web browser can be downloaded over the network 150 from one of the many servers 130. For purposes of load balancing, multiple servers 130 can also host the data for downloading the web browser. In certain instances, different versions and/or configurations of the web browser that include the features disclosed herein are available for download from a server 130 and subsequent installation depending on whether the client 130 is a mobile device or non-mobile device. The web browser, once installed on a client 130, is configured to load web pages from any one or multiple client servers 130 hosting the web pages. The servers 130 can be any device having an appropriate processor, memory, and communications capability for hosting the data for installing the web browser and for hosting the web pages. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The disclosed web browser, once downloaded from a server 130 and installed and executed on a client 130, is configured to provide a new tab page for display to a user. The new tab page automatically selects, from among several types of information, specific information to display to the user based on the user's previous selection on a new tab page. Specifically, the new tab page includes a default display of user selected web addresses or a display of previously visited web pages that a user can select. When the user submits a subsequent request to open a new web page browsing window in the web browser, either the user selected web addresses or the previously visited web pages are displayed by default based on the user's previously submitted selection. Thus, a user's display preferences for the new tab page are maintained and the limited screen space available to the user is efficiently used in accordance with the user's display preferences, thereby obviating the need for the user to repeatedly select a preferred display option.

Figure 2:
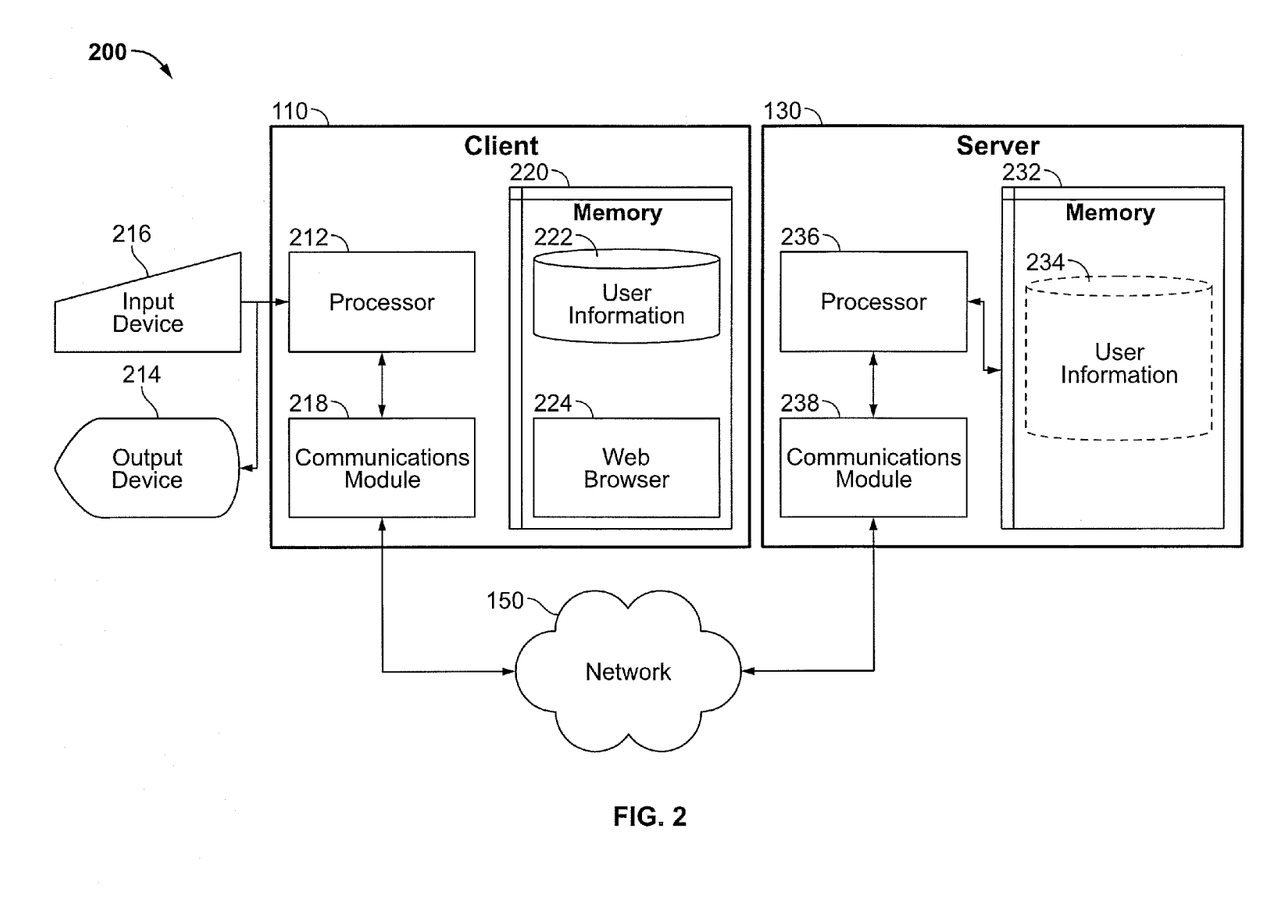
FIG. 2 is a block diagram illustrating an exemplary client and server from the architecture of FIG. 1 according to certain aspects of the disclosure.

FIG. 2 is a block diagram 200 illustrating an exemplary server 130 and client 110 in the architecture 100 of FIG. 1 according to certain aspects of the disclosure. The client and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The client 110 includes a processor 212, the communications module 218, and a memory 220 that includes a web browser 224 and user information 222. The user information 222 includes information on the user's web browsing history. For example, the information can include web addresses previously selected by a user, such as Uniform Resource Identifiers (URIs or bookmarks) previously saved by the user. The user information 222 can also include, for example, web pages previously visited by the user, such as web pages frequently visited by the user, web pages recently closed by the user, and web pages identified as being viewed in other web browsers associated with the user (e.g., web browsers the user has provided authentication information to on other clients) (or "open tabs"), including information on the other web browser or client on which the web page was viewed.

In certain aspects, a copy of the user information 234 can be stored in the memory 232 of a server 130, as illustrated in phantom in FIG. 2. The user information 234 can be provided by the processor 212 of the client to the processor 236 of the server 130 for storage in memory 232 over the network 150 using respective communications modules 218 and 238.

The client 110 also includes an output device 214, such as a display, to display the web browser 224 and an input device 216, such as a keyboard, touchscreen, or mouse, to receive user input. The processor 212 of the client 110 is configured to execute instructions, such as instructions physically coded into the processor 212, instructions received from software in memory 240, or a combination of both. For example, the processor 212 of the client 110 executes instructions from the web browser 224 to receive a request to open a new web page browsing window in the web browser 224, and provide the new web page browsing window for display. The new web page browsing window includes a default display of a collection of user selected web addresses or a collection of previously visited web pages from the user information 222 in memory 220.

The processor 212 is further configured to receive a request to display the collection that was not displayed by default in response to the request to open the new page browsing window (e.g., of the user selected web addresses or the display of previously visited web pages which was not previously displayed in response to the request to open the new web page browsing window), such as by the user clicking on or touching an actionable element (e.g., hyperlink or button) for one of the displayed user selected web addresses or the displayed previously visited web pages using mouse or touchscreen input devices 216, respectively. As a result, when a subsequent request to open a new web page browsing window in the web browser 224 is received by the processor 212, the collection that was not displayed by default in response to the request to open the new web page browsing window (e.g., the non-default display of the user selected web addresses or the previously visited web pages) becomes the default collection that is displayed by the processor 212 based on the previously received selection. Each subsequent new web page browsing window can be pre-rendered and pre-loaded after a previous new web page browsing window is displayed, thereby decreasing the amount of time taken for the client 110 to display a new web page browsing window in response to a user request.

In certain aspects, when a subsequent request to open a new web page browsing window in the web browser 224 is received by the processor 212, the user selected web addresses or the previously visited web pages are displayed by the processor 212 can be based on a previously group of received selections, such as the most frequent selection in the last ten or twenty new web page browsing windows. Additionally, if a request to open a new web page browsing window in the web browser 224 has not been received by the processor 212 for a predetermined period of time, then when a subsequent request to open a new web page browsing window in the web browser 224 is received by the processor 212, the user selected web addresses or the previously visited web pages displayed by the processor 212 can be based on a default selection.

Figure 3:
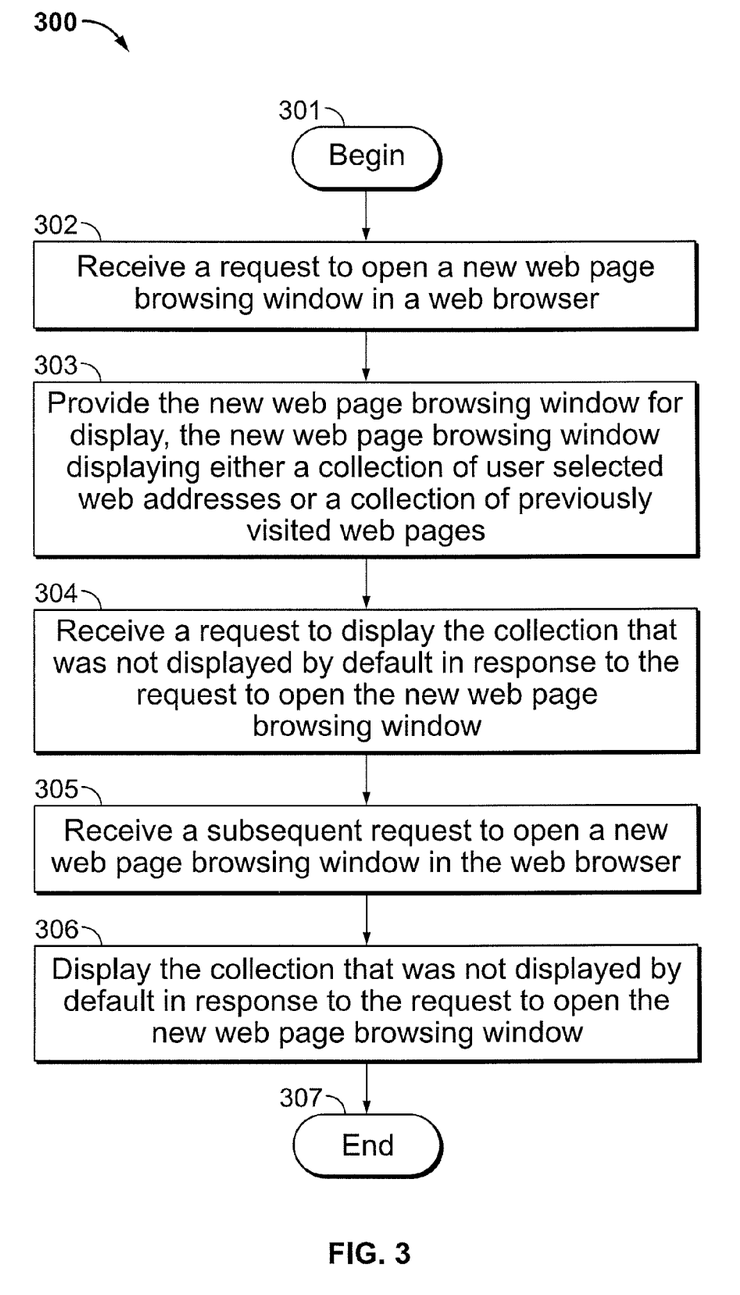
FIG. 3 illustrates an exemplary process for determining what to display to a user when the user opens a new web page browsing window in a web browser using the exemplary client of FIG. 2.

FIG. 3 sets forth an exemplary process 300 for determining what to display to a user when the user opens a new web page browsing window in a web browser 224 using the exemplary client 110 of FIG. 2. The process 300 begins by proceeding from step 301 when the mobile web browser 224 is loaded on a client 110a, such as a smartphone mobile client 110a by a user to step 302. In step 302, a user requests to open a new tab page in a mobile web browser 224, which is received by a new web page interface of the mobile web browser 224. In step 303, the new tab page is provided for display, such as one of the various different new tab pages 414 of FIGS. 4A-4C. The various new tab pages 414 include content from the user's previous web browsing history.

Figure 4A:
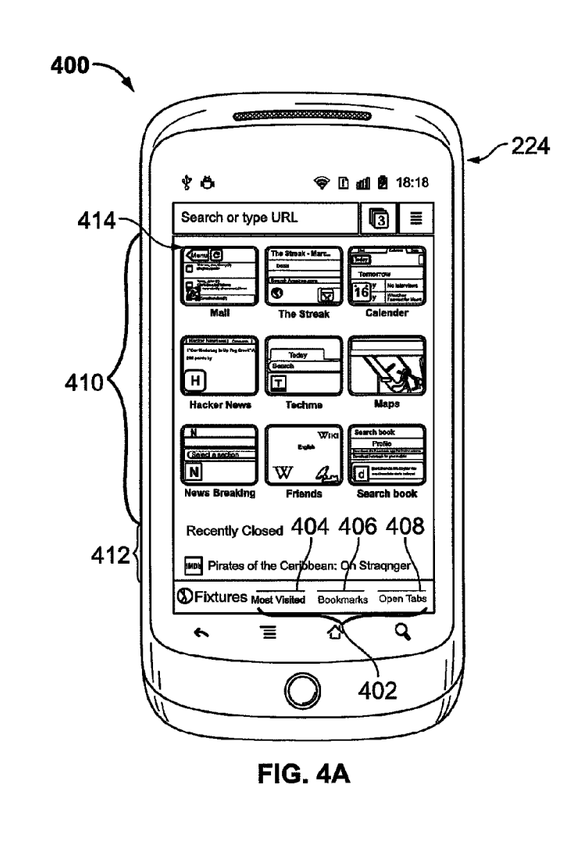
FIGS. 4A-4C are exemplary screenshots associated with the exemplary process of FIG. 3.
Figure 4B:
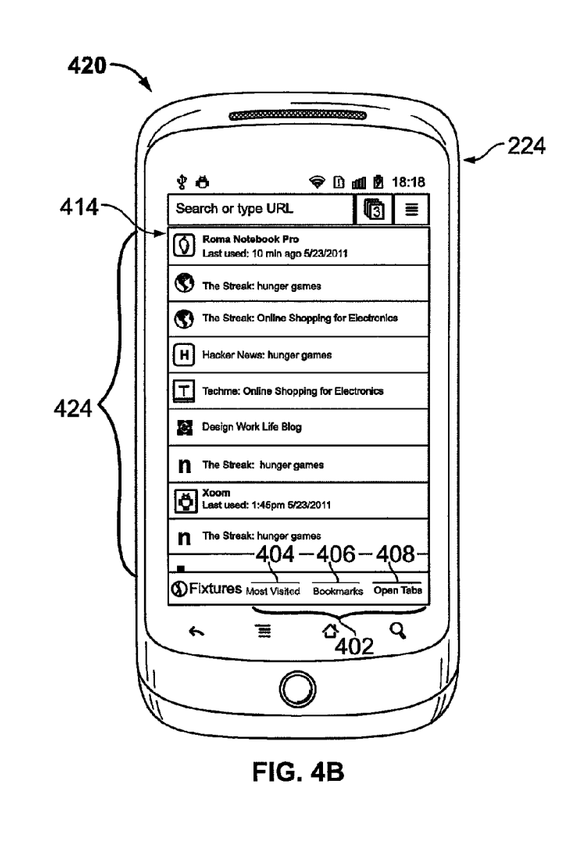
Figure 4C:
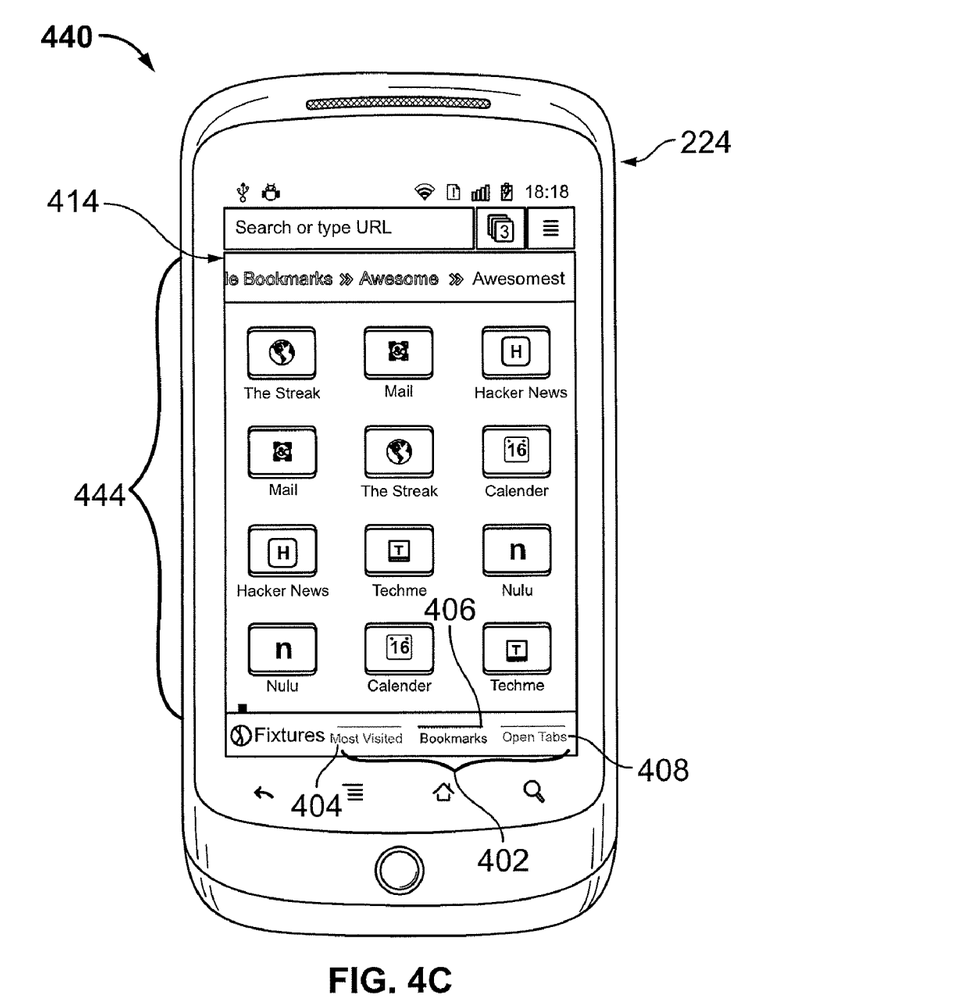

Various new tab pages 414 that can be displayed in response to a user request to open a new tab page will now be described. FIG. 4A is an exemplary screenshot 400 of a first new tab page 414 that includes a content display interface for displaying web pages previously visited by the user, namely a display of the user's most visited web pages 410 and a display of recently closed web pages 412. Any of the displayed web pages can be loaded in the new tab page 414 when selected. FIG. 4B is an exemplary screenshot 420 of a second new tab page 414 that includes a content display interface for displaying web pages previously visited by the user 424, namely open tabs that further include information on the other clients on which the web page was viewed by the user. Any of the open tabs can be loaded in the new tab page 414 when selected, FIG. 4C is an exemplary screenshot 440 of a third new tab page 414 that includes a content display interface for displaying web addresses previously selected by the user, namely a display of the user's bookmarks 444. Any of the bookmarks can be loaded in the new tab page 414 when selected. Each of the new tab pages 414 of FIGS. 4A-4C also includes a selection interface 402 for the user to choose between actionable elements for displaying the user's most visited web pages 404 (as illustrated in FIG. 4A), the user's bookmarks 406 (as illustrated FIG. 4B), or the user's open tabs 408 (as illustrated FIG. 4C).

In step 304, a selection, within the selection interface 402, of the display of the most visited web pages 404, bookmarks 406, or open tabs 408 is received. For example, the user selects to view the most visited web pages 404 in the new tab page as illustrated in FIG. 4A. In step 305, a subsequent request to open a new tab page in the mobile web browser 224 is received. In step 306, the most visited web pages 404 are displayed in the new tab page based on the previously received selection (of step 304). The process 300 then ends in step 307.

Figure 5:
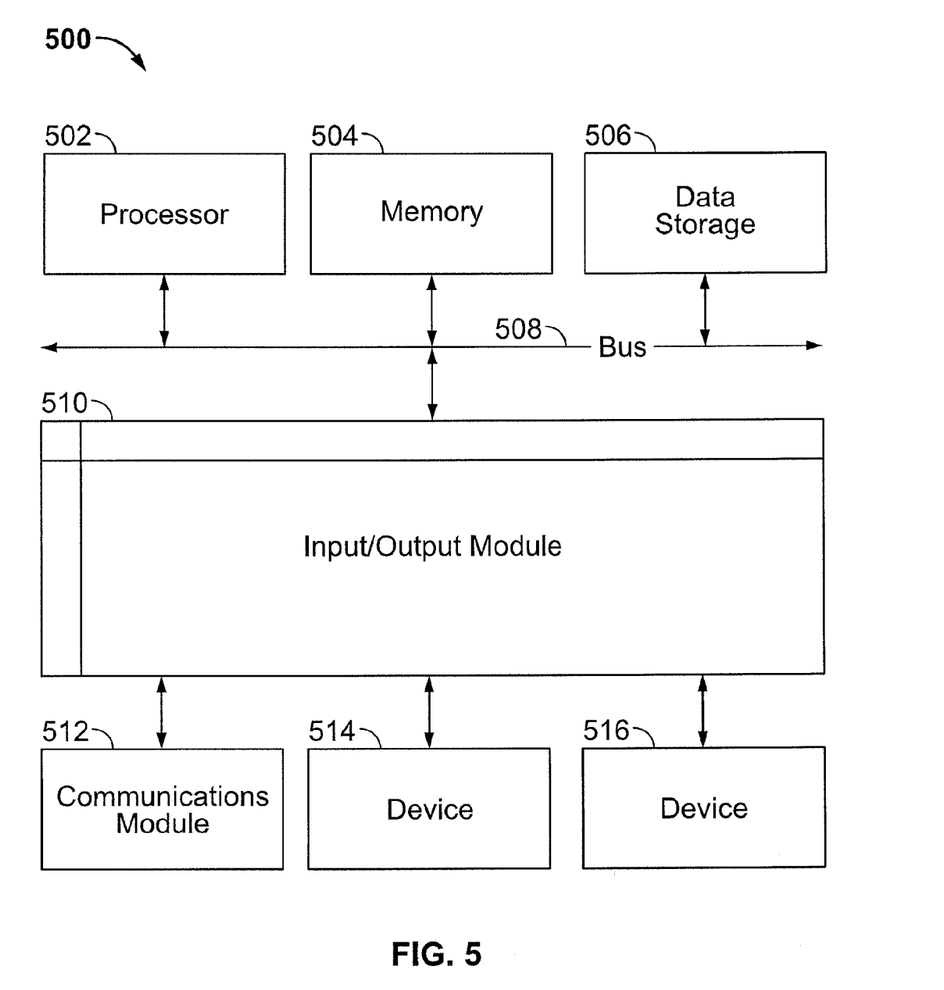
FIG. 5 is a block diagram illustrating an exemplary computer system with which the client and server of FIG. 2 can be implemented.

FIG. 5 is a block diagram illustrating an exemplary computer system 500 with which the client 110 and server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110 and server 130) includes a bus 508 or other communication mechanism for communicating information, and a processor 502 (e.g., processor 212 and 236) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., ales that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512, Exemplary communications modules 512 (e.g., communications modules 218 and 238) include networking interface cards, such as Ethernet cards and modems. In certain aspects, the input/output module 510 is configured to connect to a plurality of devices, such as an input device 514 (e.g., input device 216) and/or an output device 516 (e.g., output device 214). Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 516 include display devices, such as a CRT (cathode ray tube) or LCD (liquid crystal display) monitor, for displaying information to the user.

According to one aspect of the present disclosure, the client 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network, The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media, Non-volatile media include, for example, optical or magnetic disks, such as data storage device 506. Volatile media include dynamic memory, such as memory 504. Transmission media include coaxial cables, copper wire, and fiber optics, including the wires that comprise bus 508, Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for determining what to display to a user when the user opens a new web page browsing window in a mobile web browser, the method comprising:

receiving a request to open a new web page browsing window in a mobile web browser;

providing the new web page browsing window for display, the new web page browsing window displaying a collection of user selected web addresses, a collection of previously visited web pages open in other web browsers associated with the user, or a collection of previously visited web pages identified as being frequently viewed by the user; and pre-loading another new web page browsing window to display for a subsequent request to open a new web page browsing window in the mobile web browser, wherein each of the web pages and web addresses is displayed in a thumbnail format, and wherein the new web page browsing window is configured to display each of the collection of user selected web addresses, the collection of previously visited web pages open in other web browsers associated with the user and an identification of the other web browsers in which the previously visited web pages are currently open, and the collection of previously visited web pages identified as being frequently viewed by the user.

2. The computer-implemented method of claim 1, wherein the user selected web addresses comprise Uniform Resource Identifiers (URI) previously saved by the user.

3. The computer-implemented method of claim 1, wherein the new web page browsing window is configured to display a collection of previously visited web pages identified as being recently closed by the user.

4. The computer-implemented method of claim 1, wherein the new web page browsing window includes a display limited to one of the collections.

5. The computer-implemented method of claim 1, wherein the collection of previously visited web pages identified as being frequently viewed by the user is limited to a pre-determined number of web pages identified as being the most frequently viewed by the user.

6. The computer-implemented method of claim 1, further comprising receiving a request to display a collection that was not displayed by default in response to the request to open the new web page browsing window, wherein the collection that was not displayed by default in response to the request to open the new web page browsing window becomes the default collection to display for the subsequent request.

7. The computer-implemented method of claim 6, wherein receiving the request to display the collection that was not displayed by default in response to the request to open the new web page browsing window comprises the user selecting at least one of an actionable element for the displayed collection.

8. The computer-implemented method of claim 1, further comprising pre-rendering the pre-loaded another new web page browsing window.

9. A system for determining what to display to a user when the user opens a new web page browsing window in a mobile web browser, the system comprising:

a memory comprising instructions for opening a new web page browsing window in a mobile web browser; and a processor configured to execute the instructions to:

receive a request to open a new web page browsing window in a mobile web browser;

provide the new web page browsing window for display in response to the request to open the new web page browsing window, the new web page browsing window displaying, by default, a collection of user selected web addresses, a collection of previously visited web pages open in other web browsers associated with the user and an identification of the other web browsers in which the previously visited web pages are currently open, or a collection of previously visited web pages identified as being frequently viewed by the user; and pre-load another new web page browsing window to display for a subsequent request to open a new web page browsing window in the mobile web browser, wherein each of the web pages and web addresses is displayed in a thumbnail format, and wherein the new web page browsing window is configured to display each of the collection of user selected web addresses, the collection of previously visited web pages open in other web browsers associated with the user, and the collection of previously visited web pages identified as being frequently viewed by the user.

10. The system of claim 9, wherein the user selected web addresses comprise Uniform Resource Identifiers (URI) previously saved by the user.

11. The system of claim 9, wherein the new web page browsing window is configured to display a collection of previously visited web pages identified as being recently closed by the user.

12. The system of claim 9, wherein the new web page browsing window includes a display limited to one of the collections.

13. The system of claim 9, wherein the collection of previously visited web pages identified as being frequently viewed by the user is limited to a pre-determined number of web pages identified as being the most frequently viewed by the user.

14. The system of claim 9, wherein the processor is further configured to execute the instructions to receive a request to display a collection that was not displayed by default in response to the request to open the new web page browsing window, wherein the collection that was not displayed by default in response to the request to open the new web page browsing window becomes the default collection to display for the subsequent request.

15. The system of claim 14, wherein the processor being configured to receive the request to display the collection that was not displayed by default in response to the request to open the new web page browsing window comprises the user selecting at least one of an actionable element for the displayed collection.

16. The system of claim 9, wherein the processor is further configured to execute the instructions to pre-render the pre-loaded another new web page browsing window to display for the subsequent request.

17. A mobile device comprising:
a display device;
a new web page interface configured to receive a request to open a new web page browsing window comprising, by default, either a collection of user selected web addresses, a collection of previously visited web pages open in other web browsers associated with the user, or a collection of previously visited web pages identified as being frequently viewed by the user; and
a content display interface configured to display, on the display device, one of the collections, and pre-load another new web page browsing window to display for a subsequent request to open a new web page browsing window in the mobile web browser,
wherein each of the web pages and web addresses is displayed in a thumbnail format, and
wherein the new web page browsing window is configured to display each of the collection of user selected web addresses, the collection of previously visited web pages open in other web browsers associated with the user and an identification of the other web browsers in which the previously visited web pages are currently open, and the collection of previously visited web pages identified as being frequently viewed by the user.

18. A non-transitory machine-readable storage medium comprising machine-readable instructions for causing a processor to execute a method for determining what to display to a user when the user opens a new web page browsing window in a web browser, the method comprising:
receiving a request to open a new web page browsing window in a mobile web browser;
providing the new web page browsing window for display, the new web page browsing window displaying either a collection of Uniform Resource Identifiers (URI) previously saved by the user, a collection of web pages identified as being open in other web browsers associated with the user and an identification of the other web browsers in which the previously visited web pages are currently open, or a collection of web pages identified as being frequently viewed by the user; and
pre-loading another new web page browsing window to display for a subsequent request to open a new web page browsing window in the mobile web browser,
wherein each of the URIs and web addresses is displayed in a thumbnail format, and
wherein the new web page browsing window is configured to display each of the collection of URIs previously saved by the user, the collection of web pages identified as being open in other web browsers associated with the user, and the collection of previously visited web pages identified as being frequently viewed by the user.

\* \* \* \* \*